(12) United States Patent
Balázs et al.

(10) Patent No.: US 10,007,958 B2
(45) Date of Patent: Jun. 26, 2018

(54) LIGHTING AUDIT DOCKING STATION DEVICE AND METHOD THEREOF

(71) Applicant: General Electric Company, Schenectady, NY (US)

(72) Inventors: László Balázs, Budapest (HU); András Kuti, Budapest (HU); Roland Batai, Budapest (HU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days. days.

(21) Appl. No.: 15/418,648

(22) Filed: Jan. 27, 2017

(65) Prior Publication Data

US 2017/0140485 A1  May 18, 2017

Related U.S. Application Data

(63) Continuation of application No. 14/132,128, filed on Dec. 18, 2013, now abandoned.

(60) Provisional application No. 61/836,114, filed on Jun. 17, 2013.

(51) Int. Cl.
*G06Q 50/16* (2012.01)
*G01B 11/14* (2006.01)

(52) U.S. Cl.
CPC .......... *G06Q 50/163* (2013.01); *G01B 11/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,529,268 B1* | 3/2003 | Oka | .................. | G01S 7/481 356/3.04 |
| 9,041,511 B2* | 5/2015 | Gaviria Velez | ... | H04M 1/72522 340/5.7 |
| 2004/0170318 A1* | 9/2004 | Crandall | .............. | G06K 9/6212 382/165 |
| 2011/0288818 A1* | 11/2011 | Thierman | .............. | G01B 11/00 702/159 |
| 2012/0176610 A1* | 7/2012 | Lewin | ...................... | G01J 1/02 356/233 |
| 2013/0275174 A1* | 10/2013 | Bennett | .................. | G06Q 50/08 705/7.23 |

FOREIGN PATENT DOCUMENTS

WO   2012081995 A1   6/2012

* cited by examiner

*Primary Examiner* — Janese Duley
(74) *Attorney, Agent, or Firm* — Peter T. DiMauro; GE Global Patent Operation

(57) ABSTRACT

A lighting audit system includes a lighting audit docking station in communication with the smart device and a database, where the lighting audit docking station includes a targeting unit and a camera. A lighting audit method includes providing a physical parameter to a lighting audit table for a space-under-study, representing the space-under-study on a virtual map presented on a display, adding surface characteristic data for the space-under-study into the lighting audit table, measuring the physical dimensions of the space-under-study using the targeting unit, the physical dimension measurements being stored in the lighting audit table, entering into the lighting audit table parameters for a luminaire located in the space-under-study, and calculating a lighting audit for the space-under-study based on data in the lighting audit table.

19 Claims, 4 Drawing Sheets

LIGHTING AUDIT DOCKING STATION DEVICE AND METHOD THEREOF

RELATED APPLICATION

This application is a continuation under 37 CFR 1.53 of copending, commonly-owned U.S. application Ser. No. 14/132,128, filed 13 Dec. 2013, which is hereby incorporated by reference in its entirety; said Ser. No. 14/132,128 in turn claims benefit of provisional patent application 61/836,114, filed 17 Jun. 2013.

BACKGROUND

A significant portion of electrical power consumption is used to produce lighting. The energy consumed in lighting production can be reduced through the use of energy-saving lamps and fixtures. This reduction in energy use can result in reduced costs, which can benefit all consumers of electricity including building operators and municipalities. A lighting audit of a building, municipal area, etc. can identify the lighting systems in use at the audit location, and is a first step in determining energy usage.

A lighting audit accounts for the lighting design of the facility undergoing the audit—e.g., a building, a park, a roadway, parking lot, or the like. For example, the audit can quantify the lighting design parameters for the various areas of a building (hallway, entry, offices, bathrooms, etc.).

The lighting audit identifies, counts, and records each source of light from each of the lighting fixtures along with observations about the lighting design quality (intensity, uniformity, adequacy, or the like). The lighting audit can also include a diagram of the space-under-study (e.g., building, parking lot, sports field, or the like). This diagram can accurately map the location of all light fixtures of the space-under-study, identify the type of light and its lamp, and can also include locations of lighting sources outside the property boundary that may nevertheless be illuminating the space-under-study.

Lighting audits are typically labor and time intensive; require accurate locating of the luminaire locations; and detailing of the physical geo-spatial surrounds of the space-under-study.

BRIEF DESCRIPTION

In accordance with embodiments, a lighting audit docking station can be used to conduct a lighting audit. The lighting audit docking station can include a docking port connectable to a smart device (e.g., smart phone, tablet, netbook, dedicated device, computing device, or the like), a targeting unit that can include a laser-based distance measurement unit, and a camera. The camera and laser-based distance measurement unit can be co-located in one optical unit, or optically aligned to sight at the same target. In accordance with one implementation, when the targeting unit and the camera unit are optically aligned, they are also mechanically linked so that movement of one causes movement in the other so that the optical alignment is maintained. The docking port can include a physical mate to a docking port on the body of a smart device, or can be connected to the smart device by a cable. In some implementations the lighting audit docking station can include a communication unit that can be connected to the smart device by analog or digital wireless transmission (e.g., Bluetooth, ZigBee, wLAN, WiFi, etc.). The docking station can use the communication unit to be in wireless communication with a remote server.

In accordance with further embodiments, a target audit docking station may be used to conduct a target audit. The target audit docking station may include a docking port connectable to a smart device (e.g., smart phone, tablet, netbook, dedicated device, computing device, or the like), a targeting unit that may include a laser-based distance measurement unit, and a camera. The camera and distance measurement unit may be co-located in one optical unit, or may be optically aligned to sight at the same target. In some implementations the target audit docking station may include a communication unit that may be connected to the smart device by analog or digital wireless transmission (e.g., Bluetooth, ZigBee, wLAN, WiFi, etc.). The docking station may use the communication unit to be in wireless communication with a remote server.

A lighting audit method includes providing a physical parameter to a lighting audit table for a space-under-study, representing the space-under-study on a virtual map presented on a display, adding surface characteristic data for the space-under-study into the lighting audit table, measuring the physical dimensions of the space-under-study using the targeting unit, the physical dimension measurements being stored in the lighting audit table, entering into the lighting audit table parameters for a luminaire located in the space-under-study, and calculating a lighting audit for the space-under-study based on data in the lighting audit table.

DETAILED DESCRIPTION

Figure 1:
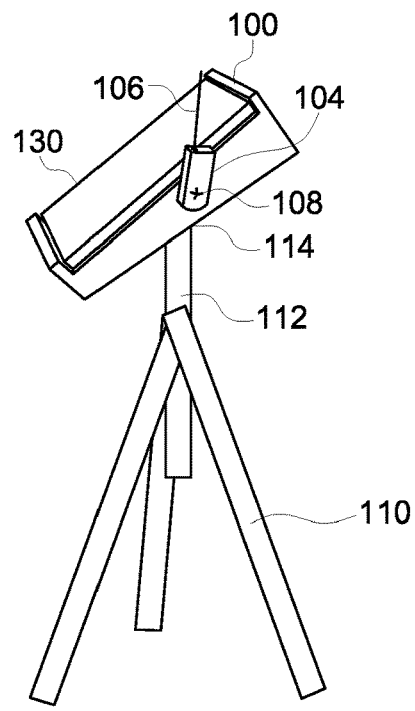
FIG. 1 depicts a perspective view of a target audit docking station in accordance with some embodiments.

FIG. 1 is a perspective view of an exemplary lighting audit docking station 100 mounted on tripod 110. Coupled to the docking station is smart device 130. Docking station 100 includes targeting unit 104. Targeting unit 104 can include a co-located laser measurement device and a camera. Laser beam 106 is used by the targeting unit to determine the distance to a target (e.g., a luminaire).

The targeting unit may be pivotably mounted to a surface of the docking station, and may be pivoted about axis 108 to site to different targets. In one implementation, the docking station may include a tripod mount that interfaces with a tripod. Alternatively, the tripod may be replaced by another similar stable mounting apparatus. To achieve full freedom of motion to direct the targeting unit, the docking station itself can be pivoted about other axes by movement of the tripod shaft 112, and/or tripod base 114.

Figure 2:
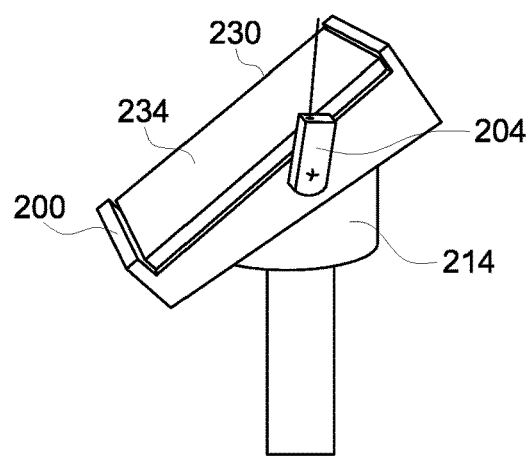
FIG. 2 depicts a close-up perspective view of the target audit docking station of FIG. 1.

FIG. 2 is a close-up perspective view of an exemplary lighting audit docking station 200. Mounted on the docking station is smart device 230, which includes a display screen 234. Rotatable targeting unit 204 includes a distance measurement device and a camera. Tripod base 214 is moveable about at least one axis, and in some implementations can be rotated and tilted.

The targeting unit can be directed towards a luminaire. Targeting can be assisted by viewing smart device screen 234, where the image from the camera can be displayed. Targeting reticles can be displayed on the smart device screen to assist in accurately positioning the targeting unit on the luminaire. When the luminaire is targeted, the laser based measurement device can determine the distance from the targeting unit to the luminaire. In some implementations, the angle to the luminaire can also be determined. This angular determination can be achieved by using sensors in the smart device, or by sensing the angular offset from a home position after moving the targeting unit and/or tripod positions. The targeting unit itself can be used to determine the height of the docking station above the ground, or this information can be entered by a user into the smart device.

Luminaire distance can be calculated by utilizing a positioning sensing unit within the smart device. The positioning sensing unit can be based on, for example, Global Positioning Satellite (GPS) data and/or Global Navigation Satellite System (GLONASS) data. Triangulation algorithms can be used to calculate the distance and angle to the targeted luminaire.

Figure 3:
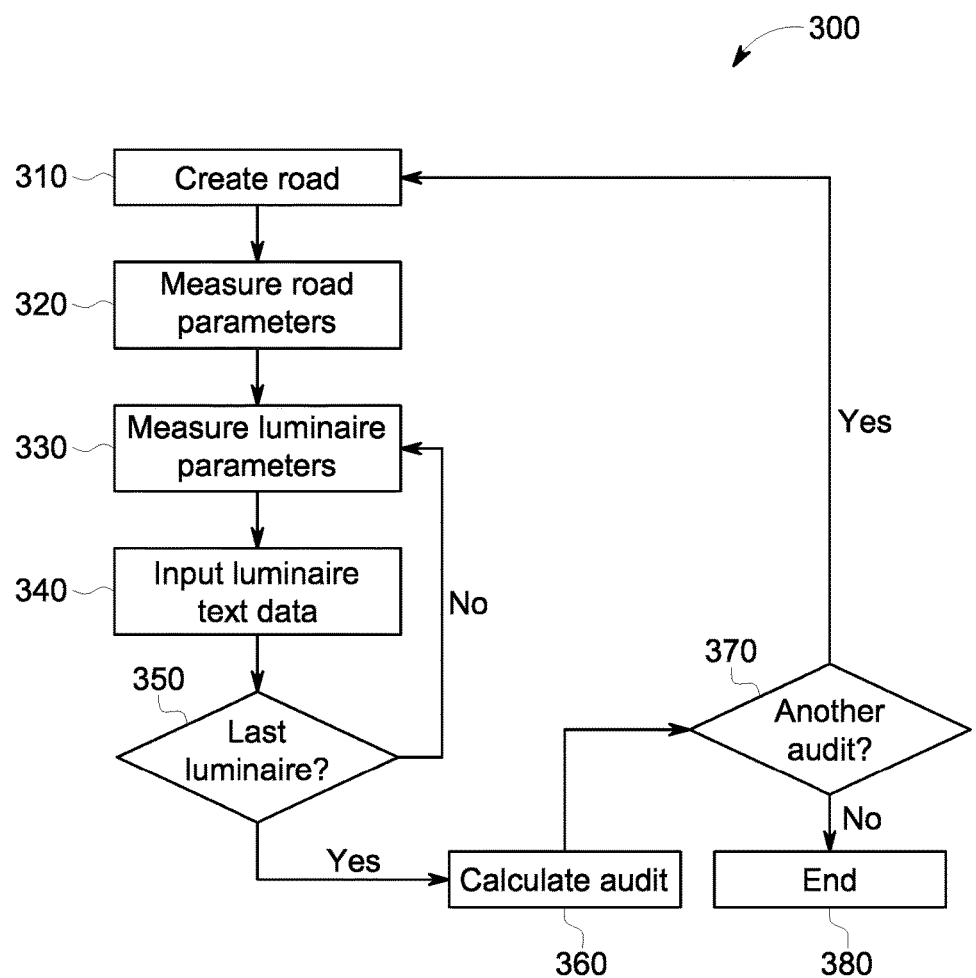
FIG. 3 depicts a process in accordance with some embodiments.

FIG. 3 depicts lighting audit process 300 in accordance with some embodiments. The first phase of process 300 is to accumulate data on the space-under-study. This data includes information on the physical layout of the space and/or information on the positioning of the luminaires. At step 310, parameter(s) for the space-under-study physical layout is collected. A user is presented with a GUI display on the smart device screen.

Figure 4:
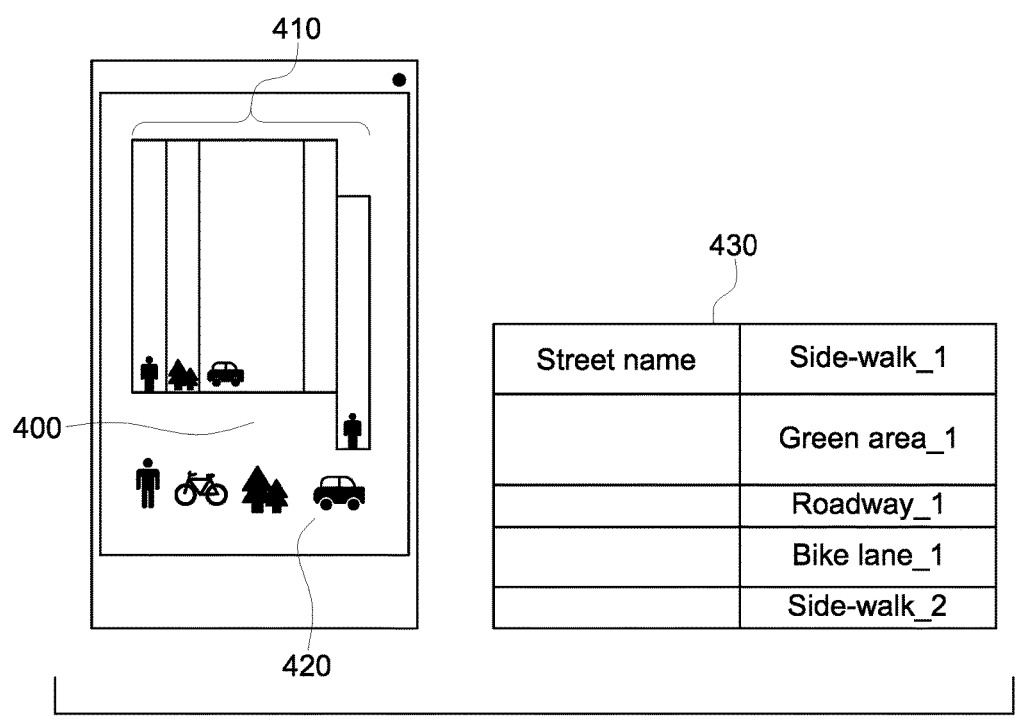
FIG. 4 depicts a graphical user interface (GUI) in accordance with some embodiments.

FIG. 4 depicts lighting audit GUI 400 in accordance with some embodiments. The space-under-study can be represented by virtual map 410. Virtual map 410 can be partitioned into multiple sections which represent the individual geo-spatial regions of the space-under-study. For example, virtual map 410 shows (moving left to right) that the space-under-study has a pedestrian walkway adjacent to a green space (trees, shrubs, grass, or the like), followed by a roadway. Adjacent to the roadway is a partition which remains to be identified (for example, a bicycle path, green space, or any other surface), followed by another pedestrian walkway.

Identifying labels can be assigned to the partitions by dragging/dropping icons 420 on the individual partitions of virtual map 410. A database can contain surface characteristics associated with each of the icons, which can be loaded into a table specific for the space-under-study. Lighting audit table 430 is a representative example of a table that includes records for the partitions of virtual map 410.

The number of road sections is not limited. While building the virtual map up, the user can drag and drop several road segments, pedestrian walkways, green spaces, etc. After the last partition is identified and labeled, the user enters the virtual map by activating an "accept" button. For example, if the space-under-study contains a pedestrian walkway, green space, and bicycle lane on each side of a roadway, the process could be (1) drag/drop pedestrian walkway; (2) drag/drop green space; (3) drag/drop bicycle lane; (4) drag/drop roadway; (5) drag/drop bicycle lane; (6) drag/drop green space; (7) drag/drop pedestrian walkway. When complete the user then activates the accept button. The partitions can be entered and identified in any order, and additional partitions can be inserted between already identified partitions.

Process 300 continues at step 320, where the physical dimension of the partitions can be measured using the targeting unit. Distances and angles can be found using a triangulation algorithm, in combination with the camera, the laser-based measurement unit, and GPS (and/or GLONASS) information from the smart device. The geometries of the road can be obtained by measurements made with a laser-based distance meter.

In one implementation, the triangulation algorithm can obtain position coordinates of the docking station using the GPS (and/or GLONASS) receiver. The distance and direction to another object (e.g., a lighting pole, building, roadside edge, landmarks, or the like) can be calculated based on the obtained coordinates and data from the distance measurement(s).

After the geo-spatial characteristics of the space-under-study are entered into the virtual map and associated lighting audit table, the parameters for each luminaire can be measured and entered, steps 330-350, into the lighting audit table by records associated with the luminaire's position in the space-under-study.

Measured luminaire parameters may include its distance and angle from the lighting audit docking station, its height above grade, and/or the length of any cantilevered extension it might be mounted on; or the like. Luminaire characteristics (e.g., illumination, luminance, glare, wattage, light source type, etc.) can be provided manually, or via a data transmission.

As described above, the targeting unit and/or the docking station can be rotated and angled to point the camera at the luminaire being measured. The camera image can be displayed on the smart device's display screen to assist in targeting the luminaire and/or its mount's base. After targeting the luminaire, a laser-based measurement can be made to determine the distance to the luminaire (both at the base of its mount, and to the luminaire fixture itself). The location of the luminaire can be calculated by a triangulation algorithm utilizing the measured distances, the height of the docking station above grade (obtained by rotating the targeting unit towards the ground), and positioning coordinates obtained from the smart device. This information is entered into the lighting audit table.

At step 340, text data regarding the luminaire is entered into the lighting audit table. This data can include the luminaire type, light source type, electrical power requirement, luminous flux, and/or candle power; or the like. This data can be entered manually, or by a data transmission. The loop of steps 330-350 is repeated for the luminaires being studied.

After information for the last luminaire of the space-under-study is entered, process 300 can then calculate the lighting audit, step 360. The contents of the lighting audit can be used by a lighting designer to calculate the current lighting condition. The current lighting condition can then be evaluated to develop a proposed lighting condition.

To evaluate the current lighting condition, the raw data results of process 300 can be transformed into a readable electronic (e.g., PDF) document (for manual lighting design) and/or into an exportable data file (e.g., CSV) for import into a lighting design software package.

After the audit is calculated, and the results stored in the database, process 300 can continue, step 370, to begin again at step 310 or terminate at step 380. Because one space-under-study could contain multiple lighting scenes if the audit begins again at step 310, the other lighting scenes are measured and a lighting audit is calculated for the scene.

Figure 5:
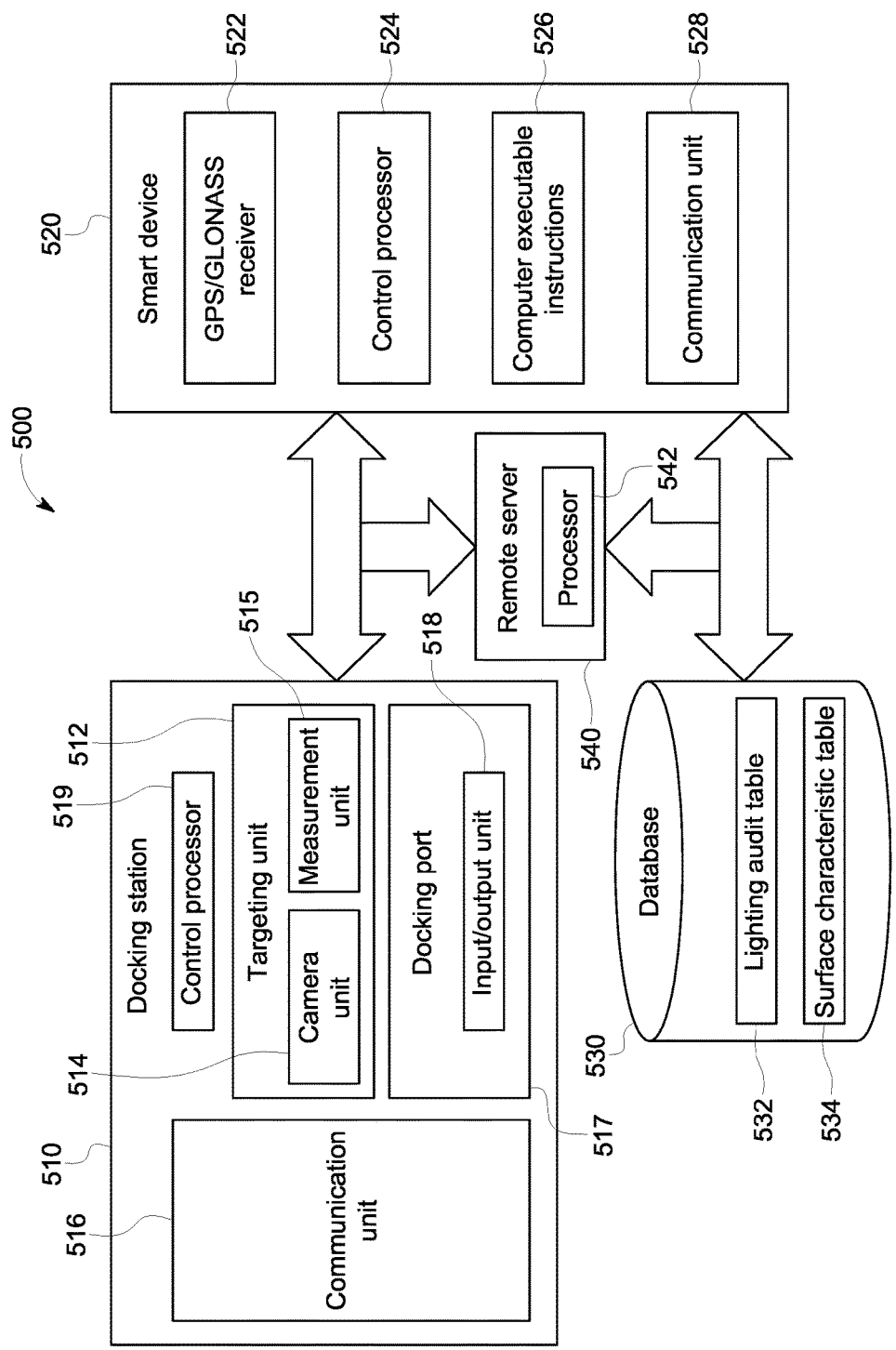
FIG. 5 depicts a lighting audit system in accordance with some embodiments.

FIG. 5 depicts lighting audit system 500 in accordance with some embodiments. The lighting audit system includes docking station 510, smart device 520, database 530, and remote server 540.

The docking station includes targeting unit 512, which contains camera unit 514 and measurement unit 515. In accordance with embodiments, measurement unit 515 can be a laser-based distance measurement unit. Docketing port 517 can include the physical port to which the smart device interfaces—either by direct mechanical coupling, via a cable, or wirelessly via Bluetooth, ZigBee, wLAN, etc. The docking port unit includes input/output unit 518 that can operate under the appropriate protocol to interface with the smart device.

Docketing station 510 can also include control processor 519 that executes instructions stored in associated memory to control the operation of docketing station 510 and its components. The docketing station can include communication unit 516, which can connect to the smart device and/or remote server 540 by analog or digital wireless transmission. In one implementation, communication unit 516 can connect to the smart device and then be connected via the smart device to the remote server.

The remote server can include processor 542 that controls the remote server's operation. The remote server can be in communication with database 530, smart device 520, and docketing station 510.

Smart device 520 is in electrical communication with the docketing station, as described above. The smart device can include a GPS/GLONASS receiver to locate the smart device, and be used to triangulate structure and luminaires in the space-under-study. Communication unit 528 transmits communication signals via wireless protocol including cellular telephone, WiFi, and, if configured, Internet. Computer-executable instructions 526 can include applications to determine angular offset movement of the smart device (tilt, yaw, roll, or the like), triangulation algorithms, data storage, and lighting audit calculation algorithms. In some implementations, computer-executable instructions can be stored in database 530, remote server 540, smart device 520, and/or docking station 510.

GPS/GLONASS coordinates can be collected for identification reasons. For example, should more than one team be working on a town-/city-wide lighting audit, a pole will be included in only one dataset if its positional coordinates where recorded.

In one implementation, computer executable instructions (and/or code) to perform the algorithms can be stored in a remote database, and accessed via communication unit 528, remote server 540, and/or communication unit 516. Control processor 524 executes instructions (and/or code) stored in associated memory to control the operation of the smart device and its components.

The smart device can be in communication with database 530 via a communication unit. The database can be located remotely in a data store, and in communication with a remote server which handles the smart device communication. Database 530 can include a lighting audit table 532, and a surface characteristics table 534.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct, or cause, a controller or processor to perform methods discussed herein such as a method for accumulating physical layout data on the space-under-study, including spatial geometries and parameters for luminaires, and calculating a lighting audit used to determine the space's current lighting condition.

The computer-readable medium may be a non-transitory computer-readable media including all forms and types of memory and all computer-readable media, but typically may exclude a transitory, propagating signal. In one implementation, the non-volatile memory or computer-readable medium may be external memory.

In accordance with embodiments, lighting audit system 500 provides a combination of tools and software that can be used to conduct an on-site lighting audit by determining positions and parameters for the geo-spatial characteristics of the space-under-study, the luminaires in this space, documenting the data by preserving it in a database linked to the system, and evaluating the data to determine current and proposed lighting conditions.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A lighting audit docking station comprising:
    a docking port connectable to a port on a smart device; and
    a targeting unit comprising:
        a measurement device configured to determine a distance measurement to a target; and
        a camera unit configured to provide an image of the target;
    wherein the measurement device and the camera unit are configured to be optically aligned to sight at the same target, and wherein the measurement device and the camera unit are mechanically linked to maintain optical alignment, and the measurement device and the camera unit are co-located in one optical unit; and
    wherein the distance measurement and the image are provided by the targeting unit to the smart device through the docking port.

2. The lighting audit docking station of claim 1, including:
    a surface having a pivotable mount; and
    the targeting unit mechanically connected to the pivotable mount.

3. The lighting audit docking station of claim 1, the targeting unit including a laser measurement device configured to transmit a laser beam towards the target to determine the distance measurement.

4. The lighting audit docking station of claim 1, wherein the distance measurement and the image are viewable on a display.

5. The lighting audit docking station of claim 1, wherein the smart device is one of a smart phone, tablet, netbook, and a computing device.

6. The lighting audit docking station of claim 1, including a communication unit configured to be in wireless communication with at least one of a remote server and the smart device.

7. A lighting audit system comprising:
    a smart device;

a lighting audit docking station in communication with the smart device;
a database in communication with at least one of the lighting audit docking station and the smart device; and
the lighting audit docking station including:
a targeting unit comprising:
    a measurement device configured to determine a distance measurement to a target; and
    a camera unit configured to provide an image of the target;
wherein the measurement device and the camera unit are configured to be optically aligned to sight at the same target, and wherein the measurement device and the camera unit are mechanically linked to maintain optical alignment, and the measurement device and the camera unit are co-located in one optical unit; and
wherein the distance measurement and the image are communicated from the lighting audit docking station to the smart device.

8. The system of claim 7, including:
a remote server in communication with the database;
the remote server in communication with at least one of the lighting audit docking station and the smart device; and
the remote server including a processor configured to control operation of the remote server.

9. The system of claim 7, the database including a lighting audit data table and a surface characteristic table.

10. The system of claim 7, the database located in a memory of at least one of the lighting audit docking station, the smart device, and a remote data store.

11. A target audit docking station comprising:
a docking port connectable to a port on a smart device; and
a targeting unit comprising:
    a measurement device configured to determine a distance measurement from the targeting unit to a target; and
    a camera unit configured to provide an image of the target,
wherein the measurement device and the camera unit are co-located within the targeting unit, and wherein the measurement device and the camera unit are configured to be optically aligned to sight at the same target, and wherein the measurement device and the camera unit are mechanically linked to maintain the optical alignment;
wherein the distance measurement and the image are provided by the targeting unit to the smart device through the docking port.

12. The target audit docking station of claim 11, including:
a surface having a pivotable mount; and
the targeting unit mechanically connected to the pivotable mount.

13. The target audit docking station of claim 11, wherein the target is a luminaire.

14. The target audit docking station of claim 11, wherein the measurement device is configured to determine an angle to the target being measured using an angular offset sensed from a position of the target audit docking station after moving position of at least one of the targeting unit or a tripod included in the target audit docking station.

15. The target audit docking station of claim 11, wherein the distance measurement and the image are viewable on a display on the smart device.

16. The target audit docking station of claim 11, including a communication unit configured to be in wireless communication with at least one of a remote server and the smart device.

17. A target audit system comprising:
a smart device;
a target audit docking station in communication with the smart device;
a database in communication with at least one of the target audit docking station and the smart device; and
the target audit docking station including:
a targeting unit comprising:
    a measurement device configured to determine a distance measurement from the targeting unit to a target; and
    a camera unit configured to provide an image of the target,
wherein the measurement device and the camera unit are co-located within the targeting unit, and wherein the measurement device and the camera unit are configured to be optically aligned to sight at the same target, and wherein the measurement device and the camera unit are mechanically linked to maintain the optical alignment;
wherein the distance measurement and the image are communicated from the target audit docking station to the smart device.

18. The system of claim 17, including:
a remote server in communication with the database;
the remote server in communication with at least one of the target audit docking station and the smart device; and
the remote server including a processor configured to control operation of the remote server.

19. The system of claim 17, wherein the database comprises a target audit data table and a surface characteristic table.

* * * * *